United States Patent
Fukazawa

(10) Patent No.: US 12,311,938 B2
(45) Date of Patent: May 27, 2025

(54) VEHICLE CONTROL DEVICE

(71) Applicant: ISUZU MOTORS LIMITED, Tokyo (JP)

(72) Inventor: Shinichiro Fukazawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 296 days.

(21) Appl. No.: 17/763,148

(22) PCT Filed: Sep. 18, 2020

(86) PCT No.: PCT/JP2020/035441
§ 371 (c)(1),
(2) Date: Mar. 23, 2022

(87) PCT Pub. No.: WO2021/060184
PCT Pub. Date: Apr. 1, 2021

(65) Prior Publication Data
US 2022/0348200 A1    Nov. 3, 2022

(30) Foreign Application Priority Data
Sep. 24, 2019   (JP) .................................. 2019-173071

(51) Int. Cl.
*B60W 30/14*   (2006.01)
*B60W 10/18*   (2012.01)
(Continued)

(52) U.S. Cl.
CPC .......... *B60W 30/146* (2013.01); *B60W 10/18* (2013.01); *B60W 40/076* (2013.01);
(Continued)

(58) Field of Classification Search
CPC .. B60W 30/146; B60W 10/18; B60W 40/076; B60W 40/105; B60W 40/13;
(Continued)

(56) References Cited

U.S. PATENT DOCUMENTS 10,073,452 B2 *   9/2018   Niino .................... B60W 30/16
11,981,314 B2 *   5/2024   Fukazawa ................ B60T 7/12
(Continued)

FOREIGN PATENT DOCUMENTS

CN   104487297 A   4/2015
JP   H11-254995 A   9/1999
(Continued)

OTHER PUBLICATIONS

The National Intellectual Property Office of China, The First Office Action, Application No. CN 202080067475.6, dated Jun. 8, 2023, in 13 pages.
(Continued)

*Primary Examiner* — Jason Holloway
(74) *Attorney, Agent, or Firm* — PROCOPIO, CORY, HARGREAVES & SAVITCH LLP

(57) ABSTRACT

A vehicle control device incudes a deceleration detection unit that detects a deceleration of a vehicle, a stop schedule specifying unit that specifies that the vehicle is scheduled to stop, a brake control unit that starts reducing a brake pressure when a vehicle speed of the vehicle becomes equal to or less than a threshold value, and a threshold value determination unit that determines the threshold value such that the threshold value increases as the deceleration detected by the deceleration detection unit increases after the stop schedule specifying unit specifies that the vehicle is scheduled to stop.

3 Claims, 6 Drawing Sheets

(51) Int. Cl.
*B60W 40/076* (2012.01)
*B60W 40/105* (2012.01)
*B60W 40/13* (2012.01)

(52) U.S. Cl.
CPC .......... *B60W 40/105* (2013.01); *B60W 40/13* (2013.01); *B60W 2300/12* (2013.01); *B60W 2510/182* (2013.01); *B60W 2530/10* (2013.01); *B60W 2552/15* (2020.02)

(58) Field of Classification Search
CPC ....... B60W 2300/12; B60W 2510/182; B60W 2530/10; B60W 2552/15; B60W 30/17; B60T 2210/20; B60T 2210/32; B60T 2230/04; B60T 2250/00; B60T 2250/02; B60T 8/18; B60T 7/22; B60T 8/32; B60T 8/172; B60T 2201/022
See application file for complete search history.

(56) References Cited

U.S. PATENT DOCUMENTS

| | | | | |
|---|---|---|---|---|
| 2013/0116874 | A1* | 5/2013 | Ichinose | ................. B60L 15/20 701/22 |
| 2015/0039199 | A1* | 2/2015 | Kikuchi | .............. B60T 8/17555 701/70 |
| 2015/0175140 | A1 | 6/2015 | Shimizu | |
| 2015/0284002 | A1 | 10/2015 | Hasegawa et al. | |
| 2016/0229402 | A1* | 8/2016 | Morita | .................... G08G 1/166 |
| 2018/0126978 | A1* | 5/2018 | Jerger | .................... B60W 10/08 |
| 2018/0126981 | A1* | 5/2018 | Gangwar | .............. B60W 30/08 |
| 2018/0354474 | A1* | 12/2018 | Zhang | ........................ B60T 7/12 |
| 2020/0276972 | A1* | 9/2020 | Ito | ................... B60W 30/18072 |

FOREIGN PATENT DOCUMENTS

| | | |
|---|---|---|
| JP | 2004-161472 A | 6/2004 |
| JP | 2004-161742 A | 6/2004 |
| JP | 2007-038794 A | 2/2007 |
| JP | 4793105 B2 | 12/2007 |
| JP | 2007-320475 A | 12/2013 |
| JP | 2016-088146 A | 5/2016 |

OTHER PUBLICATIONS

Patent Cooperation Treaty, International Search Report, Application No. PCT/JP2020/035441, dated Nov. 6, 2020, in 5 pages.
Patent Cooperation Treaty, WOSA, Application No. PCT/JP2020/035441, dated Nov. 6, 2020, in 4 pages.

* cited by examiner

VEHICLE CONTROL DEVICE

CROSS-REFERENCE TO RELATED APPLICATIONS

This application is US National Stage of International Patent Application PCT/JP2020/035441, filed Sep. 18, 2020, which claims benefit of priority from Japanese Patent Application JP2019-173071, filed Sep. 24, 2019, the contents of both of which are incorporated herein by reference.

TECHNICAL FIELD

The present disclosure relates to a vehicle control device for vehicle braking control.

BACKGROUND ART

For a vehicle that follows a preceding vehicle, a vehicle control device to improve ride quality by reducing swing back from the nose dive state that occurs when the following vehicle stops as the preceding vehicle stops is known in the related art (see, for example, Patent Literature 1). In the control device of the related art, the swing back is reduced by reducing deceleration when the vehicle speed immediately before stop is reached.

CITATION LIST

Patent Literature

Patent Literature 1: JP-A-H11-254995

SUMMARY OF INVENTION

Technical Problem

As for the control device of the related art, in a case where the deceleration immediately before stop is large, the deceleration rapidly decreases, in a case where the deceleration is reduced when the vehicle speed reaches the vehicle speed immediately before stop. As a result, it is problematic in that the swing back cannot be sufficiently reduced.

The present disclosure has been made in view of these points, and an object of the present disclosure is to provide a vehicle control device capable of reducing swing back when a vehicle is stopped.

Solution to Problem

A vehicle control device of the present disclosure includes: a deceleration detection unit that detects a deceleration of a vehicle; a stop schedule specifying unit that specifies that the vehicle is scheduled to stop; a brake control unit that starts reducing a brake pressure when a vehicle speed of the vehicle becomes equal to or less than a threshold value; and a threshold value determination unit that determines the threshold value such that the threshold value increases as the deceleration detected by the deceleration detection unit increases after the stop schedule specifying unit specifies that the vehicle is scheduled to stop.

The vehicle control device may further include a gradient specifying unit that specifies a gradient of a road where the vehicle is traveling, and the threshold value determination unit may determine the threshold value based further on the gradient specified by the gradient specifying unit.

The threshold value determination unit may make the threshold value in a case where the gradient is an upslope larger than the threshold value in a case where the gradient is a downslope.

The vehicle control device may further include a weight specifying unit that specifies a weight of the vehicle, and the threshold value determination unit may determine the threshold value based further on the weight specified by the weight specifying unit.

Advantageous Effects of Invention

According to the present disclosure, it is possible to reduce swing back when a vehicle is stopped.

DESCRIPTION OF EMBODIMENTS

[Overview of Vehicle T]

Figure 1:
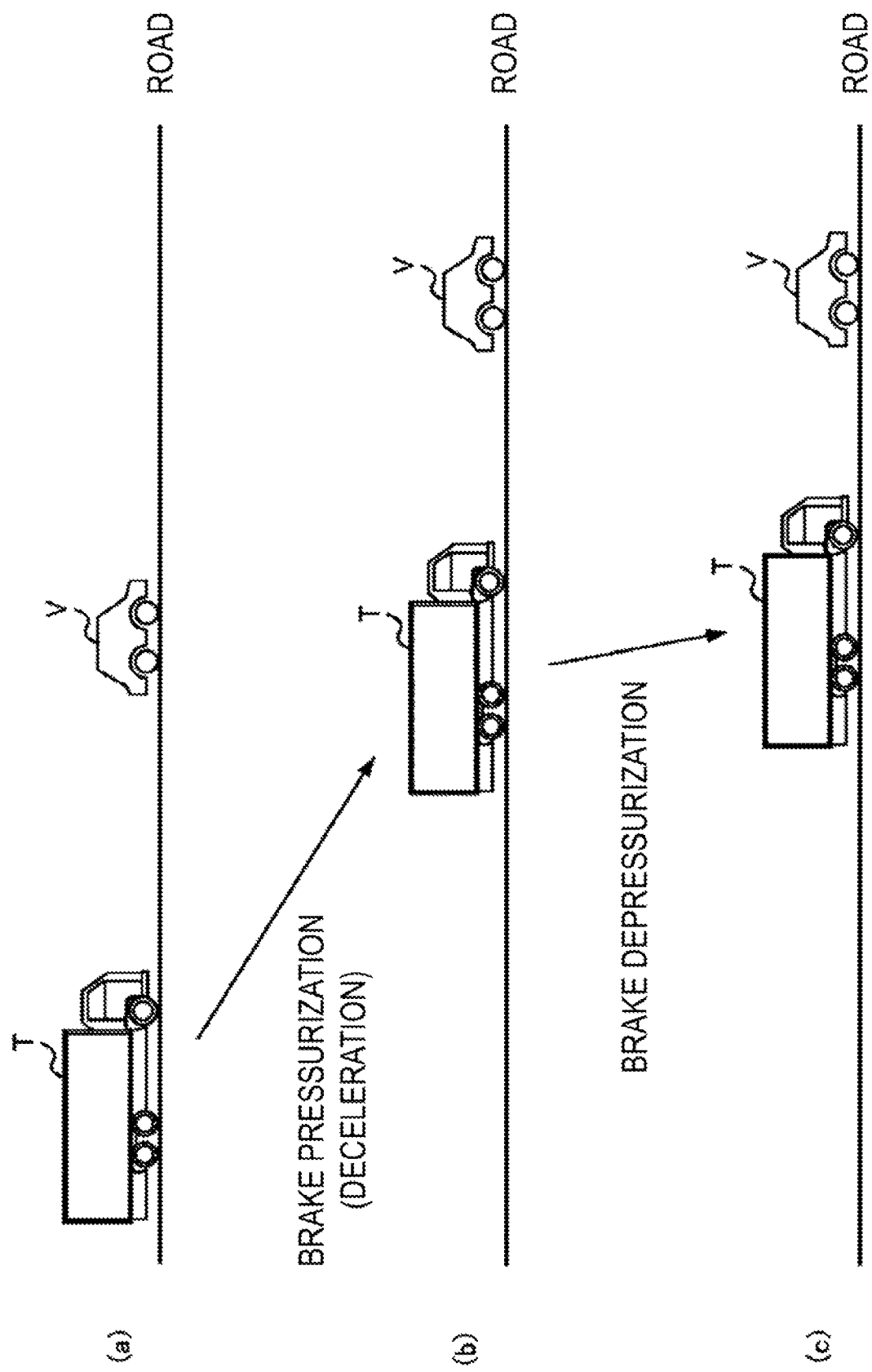
FIG. 1 is a diagram illustrating an overview of a vehicle.

FIG. 1 is a diagram illustrating an overview of a vehicle T according to the present embodiment. FIG. 1 illustrates a state where the vehicle T, which is a commercial vehicle, is traveling behind a preceding vehicle V. The vehicle T has an adaptive cruise control (ACC) function and travels while controlling its own speed to follow the speed of the preceding vehicle V.

It is assumed that the preceding vehicle V has started deceleration to stop in the state (a) illustrated in FIG. 1. The vehicle T detects that the preceding vehicle V stops and starts deceleration to stop, as shown in the state (b) illustrated in FIG. 1.

Subsequently, the vehicle T reduces its own brake pressure when the vehicle speed becomes equal to or less than a threshold value, as shown in the state (c) illustrated in FIG. 1. As a result of the brake pressure reduction, it is possible to reduce the swing back that occurs when the vehicle T stops. However, the magnitude of the swing back depends on the magnitude of the deceleration immediately before the vehicle T stops. In other words, in a case where the deceleration immediately before the vehicle T stops is large, the swing back at stop is larger than in a case where the deceleration immediately before the vehicle T stops is small.

In this regard, the vehicle T determines the threshold value of the vehicle speed at which the brake pressure reduction is started, based on the magnitude of the deceleration, to sufficiently reduce the swing back regardless of the magnitude of the deceleration immediately before the vehicle stops. By the vehicle T determining the threshold value of the vehicle speed at which the brake pressure reduction is started based on the magnitude of the deceleration, the swing back can be reduced regardless of the traveling state of the vehicle T. Hereinafter, a configuration and operation of the vehicle T will be described in detail.

[Configuration of Vehicle T]

Figure 2:
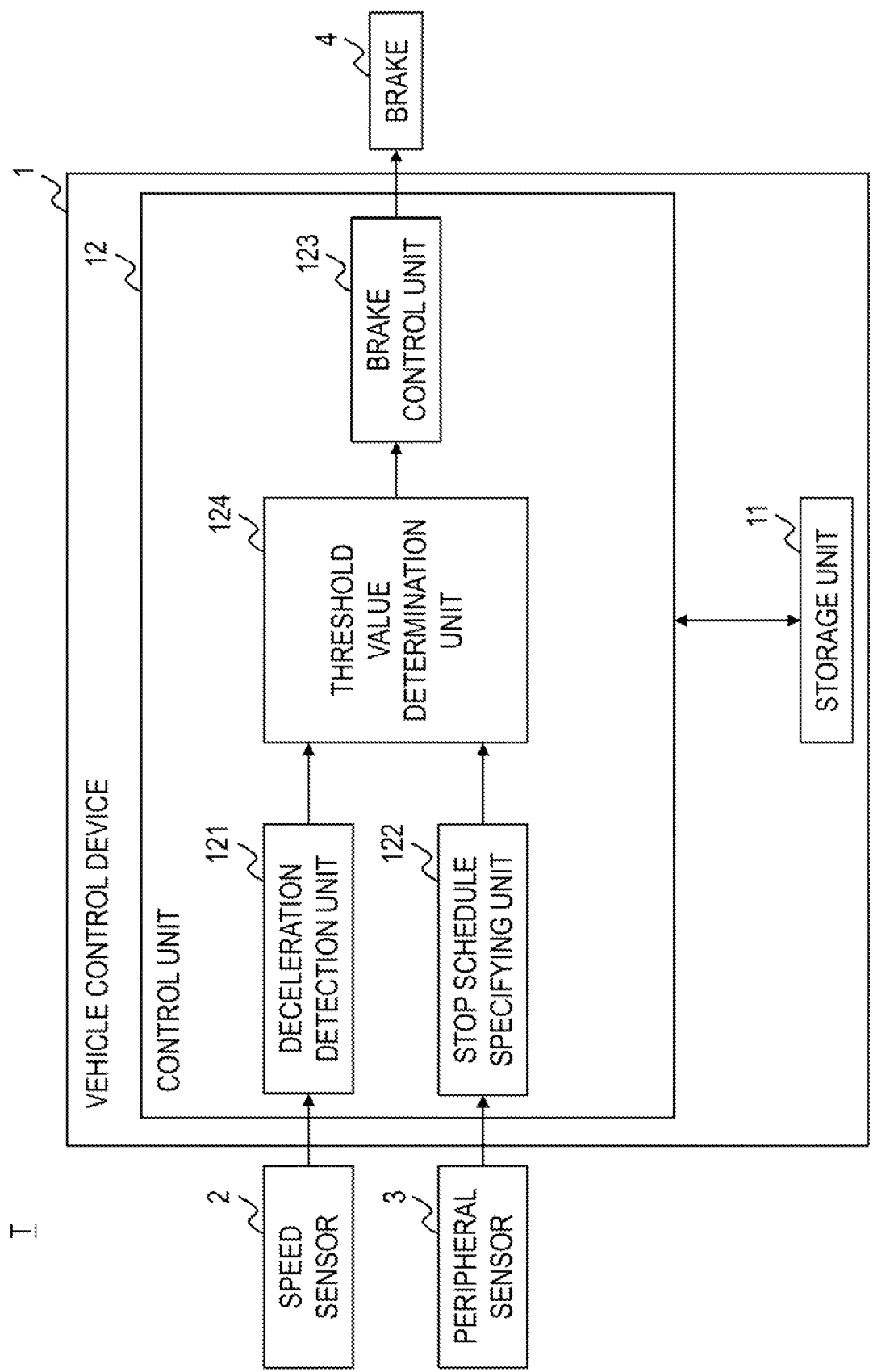
FIG. 2 is a diagram illustrating a configuration of the vehicle.

FIG. 2 is a diagram illustrating the configuration of the vehicle T. The vehicle T includes a vehicle control device 1, a speed sensor 2, a peripheral sensor 3, and a brake 4.

The vehicle control device 1 is a device that controls when to reduce the brake pressure as described above and is, for example, an electronic control unit (ECU). The vehicle control device 1 includes a storage unit 11 and a control unit 12. The control unit 12 includes a deceleration detection unit 121, a stop schedule specifying unit 122, a brake control unit 123, and a threshold value determination unit 124. The vehicle control device 1 will be described in detail later.

The speed sensor 2 detects a traveling speed of the vehicle T. The speed sensor 2 inputs data indicating the detected speed to the deceleration detection unit 121.

The peripheral sensor 3 detects states around the vehicle T. The peripheral sensor 3 has, for example, a radar component or a camera, and detects, for example, a speed of the preceding vehicle V. The peripheral sensor 3 inputs the detected speed to the stop schedule specifying unit 122. The peripheral sensor 3 may detect the deceleration of the preceding vehicle V and input the detected deceleration to the stop schedule specifying unit 122. The peripheral sensor 3 may detect a distance from the vehicle T to the preceding vehicle V and input the detected distance to the stop schedule specifying unit 122. The peripheral sensor 3 may detect other states such as traffic light, stop line, pedestrian, or obstacle affecting the traveling of the vehicle T and input the detected result to the stop schedule specifying unit 122.

[Configuration of Vehicle Control Device 1]

The storage unit 11 includes a storage medium such as a read only memory (ROM) and a random access memory (RAM). The storage unit 11 stores, for example, a program executed by the control unit 12. The storage unit 11 may temporarily store various data input from the speed sensor 2 and the peripheral sensor 3.

The control unit 12 includes, for example, a central processing unit (CPU). The control unit 12 functions as the deceleration detection unit 121, the stop schedule specifying unit 122, the brake control unit 123, and the threshold value determination unit 124, by executing the program stored in the storage unit 11.

The deceleration detection unit 121 detects the deceleration of the vehicle T based on a change in the speed input from the speed sensor 2. The deceleration detection unit 121 detects the deceleration by calculating, for example, the amount of decrease per unit time in the speed acquired from the speed sensor 2 at a predetermined time interval (e.g. 100 milliseconds). The deceleration detection unit 121 notifies the brake control unit 123 of the detected deceleration.

The stop schedule specifying unit 122 specifies that the vehicle T is scheduled to stop. The stop schedule specifying unit 122 determines that the vehicle T is scheduled to stop, based on, for example, a change in the speed of the preceding vehicle V input from the peripheral sensor 3. Specifically, the stop schedule specifying unit 122 determines that the vehicle T is scheduled to stop, in a case where the vehicle speed of the preceding vehicle V is equal to or less than a first threshold value, and the deceleration of the preceding vehicle V is equal to or greater than a second threshold value. The stop schedule specifying unit 122 may determine that the vehicle T is scheduled to stop, in a case where the peripheral sensor 3 detects a traffic light, a stop line, a pedestrian, an obstacle, or the like. In a case where the stop schedule specifying unit 122 specifies that the vehicle T is scheduled to stop, the stop schedule specifying unit 122 notifies the brake control unit 123 to that effect.

The brake control unit 123 controls the speed of the vehicle T by changing the brake pressure of the vehicle T. The brake pressure reduction is started when the vehicle speed of the vehicle T becomes equal to or less than the threshold value as a result of the operation of the brake of the vehicle T to decelerate. The brake control unit 123 determines when to start the brake pressure reduction using the threshold value notified from the threshold value determination unit 124. The brake control unit 123 may finely adjust the brake pressure such that the vehicle T stops at a position where the vehicle T should stop after the brake pressure reduction is started.

The threshold value determination unit 124 determines the threshold value used for determining the timing at which the brake control unit 123 starts reducing the brake pressure. Specifically, the threshold value determination unit 124 determines the threshold value of the vehicle speed at the time when the brake control unit 123 starts reducing the brake pressure, based on the deceleration detected by the deceleration detection unit 121 after the stop schedule specifying unit 122 specifies that the vehicle T is scheduled to stop.

For example, the threshold value determination unit 124 determines the threshold value, based on the deceleration at the time when the vehicle speed of the vehicle T detected by the speed sensor 2 reaches a predetermined speed (e.g. 20 km per hour) after the stop schedule specifying unit 122 specifies that the vehicle T is scheduled to stop. As an example, the threshold value determination unit 124 increases the threshold value as the deceleration of the vehicle T increases, and decreases the threshold value as the deceleration of the vehicle T decreases.

Figure 3:
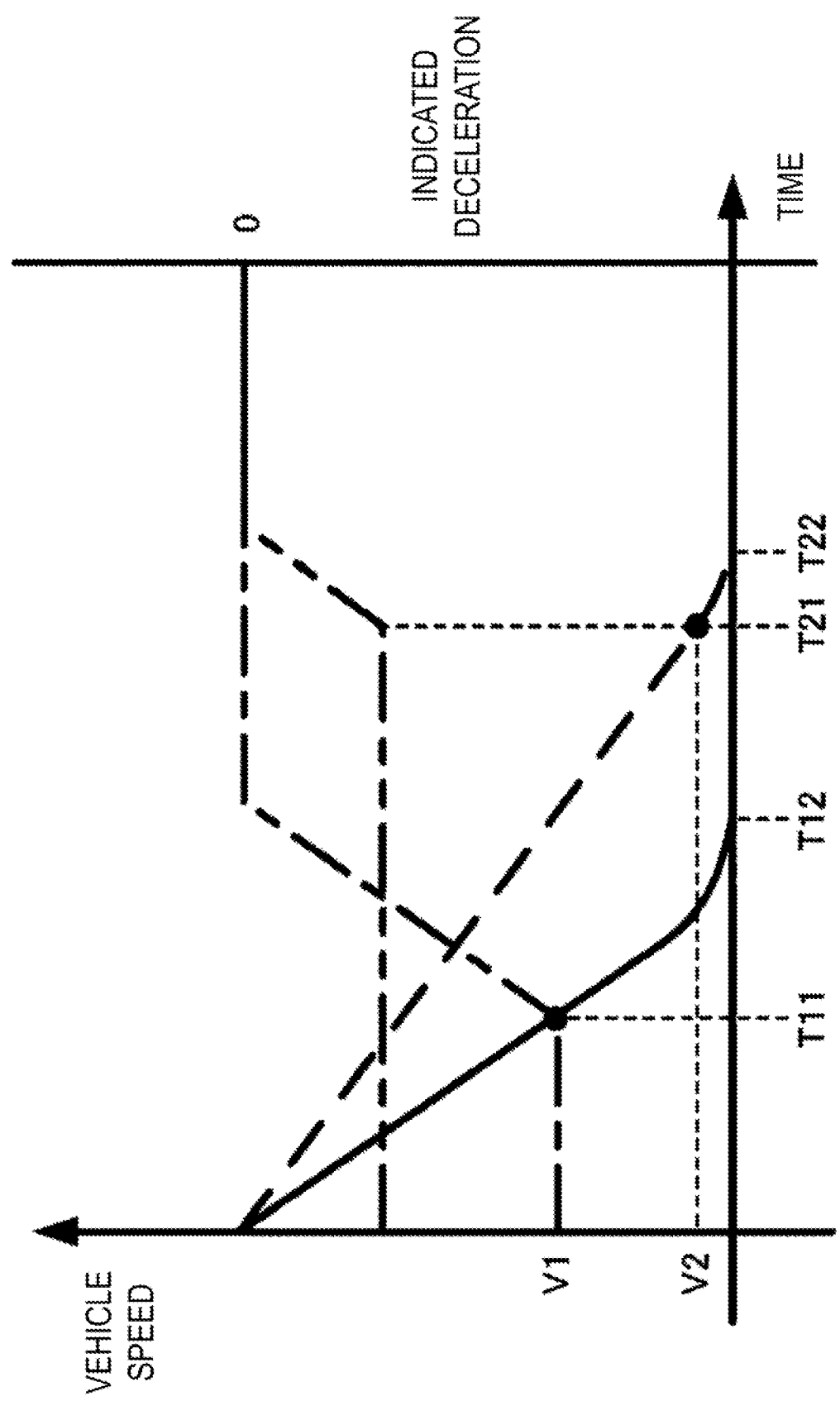
FIG. 3 is a diagram illustrating an example of the operation of a threshold value determination unit.

FIG. 3 is a diagram illustrating an example of the operation of the threshold value determination unit 124. The horizontal axis in FIG. 3 is the elapsed time from the time when the threshold value is determined. The vertical axis on the left side is the vehicle speed of the vehicle T. The vertical axis on the right side is the indicated value of the deceleration of the vehicle T. The absolute value of the indicated value of the deceleration increases toward the lower part of FIG. 3. The indicated value of the deceleration has a correlation with the brake pressure determined by the brake control unit 123, and the vertical axis on the right side of FIG. 3 may be the brake pressure. In this case, the brake pressure decreases toward the upper part of the vertical axis.

The solid line in FIG. 3 indicates how the vehicle speed changes in a case where the deceleration is large, and the broken line in FIG. 3 indicates how the vehicle speed changes in a case where the deceleration is small. The one-dot chain line in FIG. 3 indicates how the indicated value of the deceleration changes (that is, how the brake pressure changes) in a case where the deceleration is large, and the two-dot chain line in FIG. 3 indicates how the indicated value of the deceleration changes (that is, how the brake pressure changes) in a case where the deceleration is small.

In a case where the deceleration is large, a speed V1 is set as the threshold value and the brake control unit 123 starts reducing the brake pressure at time T11, when the vehicle speed of the vehicle T becomes V1. Subsequently, the vehicle T is stopped at time T12 due to, for example, friction or air resistance received by the vehicle T. When the vehicle T is stopped, the brake pressure is sufficiently small, and thus swing back hardly occurs.

In a case where the deceleration is small, a speed V2 smaller than the speed V1 is set as the threshold value and the brake control unit 123 starts reducing the brake pressure at time T21, when the vehicle speed of the vehicle T becomes V2. Subsequently, the vehicle T is stopped at time T22 due to, for example, friction or air resistance received by the vehicle T. In this case as well, the brake pressure is sufficiently small when the vehicle T is stopped, and thus swing back hardly occurs.

The deceleration rapidly changes and a large swing back occurs on condition that the brake control unit 123 starts reducing the brake pressure when the vehicle speed reaches V2 in a case where the deceleration is large. On the other hand, by the threshold value determination unit 124 determining the threshold value as described above, the speed of deceleration change decreases, and thus swing back can be reduced regardless of the deceleration of the vehicle T.

[First Modification Example]

Figure 4:
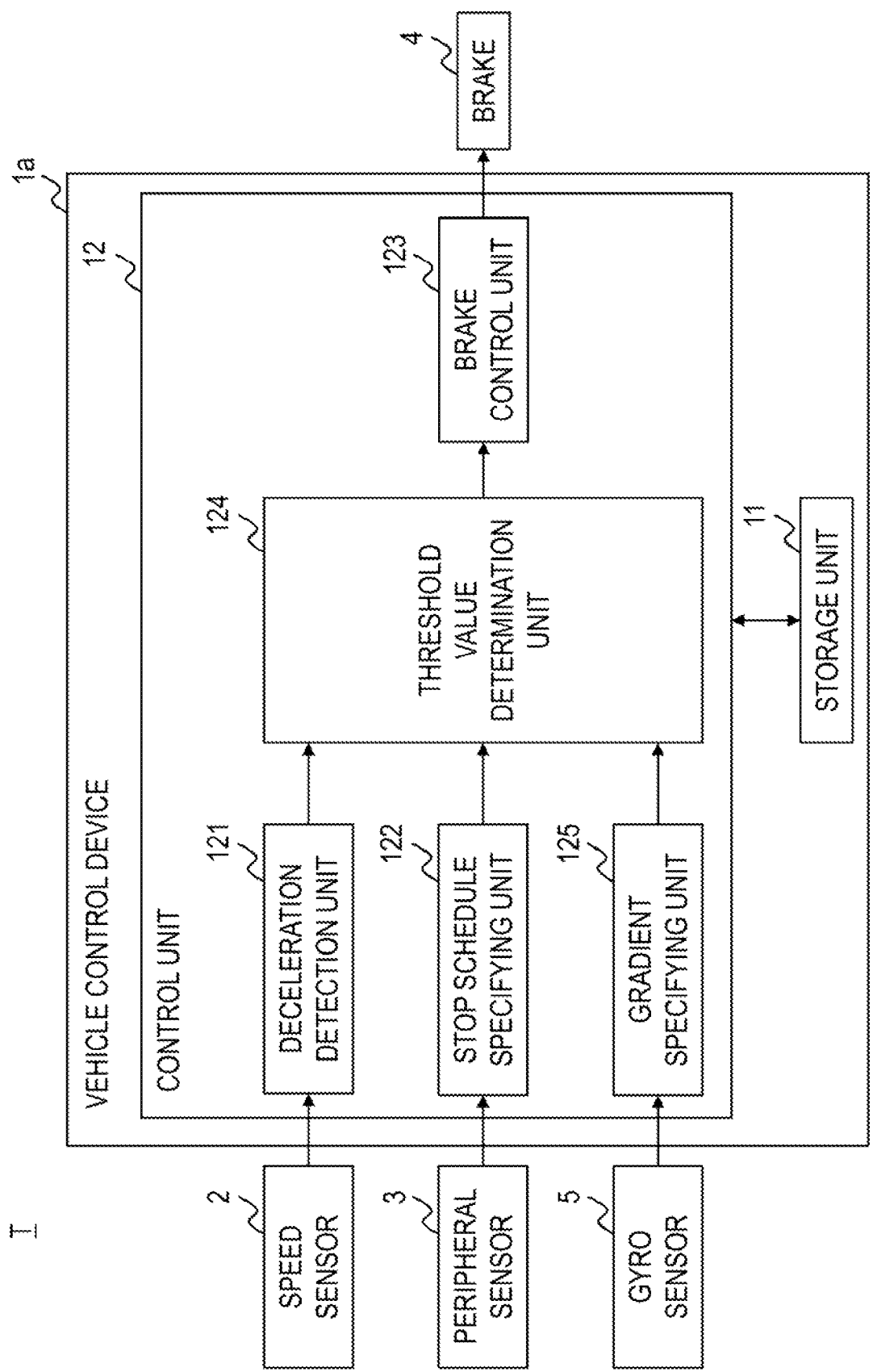
FIG. 4 is a diagram illustrating a configuration of a vehicle control device according to a first modification example.

FIG. 4 is a diagram illustrating the configuration of a vehicle control device 1a according to a first modification example. The vehicle control device 1a is different from the vehicle control device 1 illustrated in FIG. 2 only in that the vehicle control device 1a further includes a gyro sensor 5 and a gradient specifying unit 125.

The gyro sensor 5 detects an angular acceleration and notifies the gradient specifying unit 125 of the detected angular acceleration. The gradient specifying unit 125 specifies the gradient of the road on which the vehicle T is traveling, based on, for example, the angular acceleration notified from the gyro sensor 5. The gradient specifying unit 125 may specify the gradient by a method other than the method using the angular acceleration. The gradient specifying unit 125 notifies the threshold value determination unit 124 of the specified gradient.

The threshold value determination unit 124 determines the threshold value based further on the gradient specified by the gradient specifying unit 125. For example, the threshold value determination unit 124 determines the threshold value in a case where the gradient is an upslope larger than the threshold value in a case where the gradient is a downslope. The threshold value determination unit 124 may increase the threshold value as the gradient of the upslope increases.

In a case where the gradient of the upslope is large, the vehicle T decelerates faster than in a case where the gradient of the upslope is small after the brake pressure decreases due to gravity. Accordingly, by increasing the threshold value of the vehicle speed at which the brake control unit 123 starts reducing the brake pressure as the gradient of the upslope increases, the brake pressure decreases earlier than in a case where the gradient of the upslope is small, and thus the vehicle T stops with no brake pressure applied. As a result, the vehicle T can be stopped while reducing swing back.

[Second Modification Example]

Figure 5:
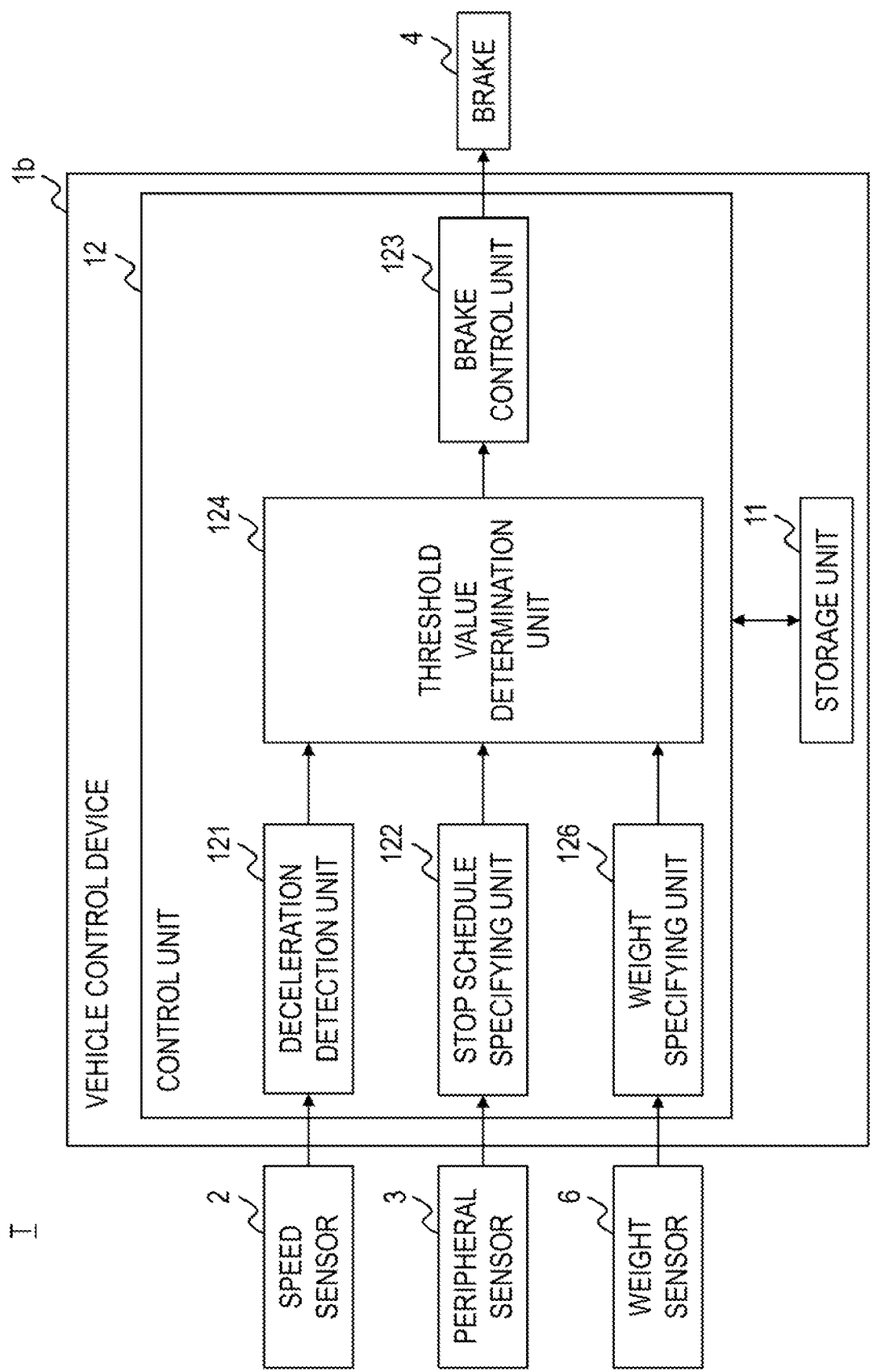
FIG. 5 is a diagram illustrating a configuration of a vehicle control device according to a second modification example.

FIG. 5 is a diagram illustrating the configuration of a vehicle control device 1b according to a second modification example. The vehicle control device 1b is different from the vehicle control device 1 illustrated in FIG. 2 only in that the vehicle control device 1b further includes a weight sensor 6 and a weight specifying unit 126.

The weight sensor 6 detects the weight of the vehicle T and notifies the weight specifying unit 126 of data indicating the detected weight. The weight specifying unit 126 specifies the weight of the vehicle T, based on the data notified from the weight sensor 6. The weight specifying unit 126 notifies the threshold value determination unit 124 of the specified weight.

The threshold value determination unit 124 determines the threshold value based further on the weight specified by the weight specifying unit 126. The threshold value determination unit 124 reduces the threshold value as the weight increases. In a case where the weight of the vehicle T is heavy, the vehicle T is easier to proceed, than in a case where the weight is light, due to inertia even after the brake pressure becomes zero. By reducing the threshold value in a case where the weight is heavy, the brake control unit 123 is capable of starting reducing the brake pressure after the vehicle speed is sufficiently reduced. As a result, the vehicle T can be safely stopped even in a case where the weight is heavy and swing back can be reduced.

[Third Modification Example]

The threshold value determination unit 124 may determine the threshold value based on both the road surface gradient described in the second modification example and the weight of the vehicle T described in the third modification example. In this case, the storage unit 11 may store a look-up table including threshold values corresponding to a plurality of combinations of the deceleration of the vehicle T, the road surface gradient, and the weight of the vehicle T, and the threshold value determination unit 124 may determine the threshold value by referring to the look-up table. By the threshold value determination unit 124 determining the threshold value based on the plurality of elements in this manner, swing back can be reduced regardless of the situations of the vehicle T and the surroundings of the vehicle T.

[Fourth Modification Example]

Exemplified in the above description is a case where the threshold value determination unit 124 determines the threshold value, based on the deceleration at the time when the vehicle speed of the vehicle T detected by the speed sensor 2 reaches a predetermined speed after the stop schedule specifying unit 122 specifies that the vehicle T is scheduled to stop. The threshold value determination method of the threshold value determination unit 124 is not limited thereto.

Figure 6:
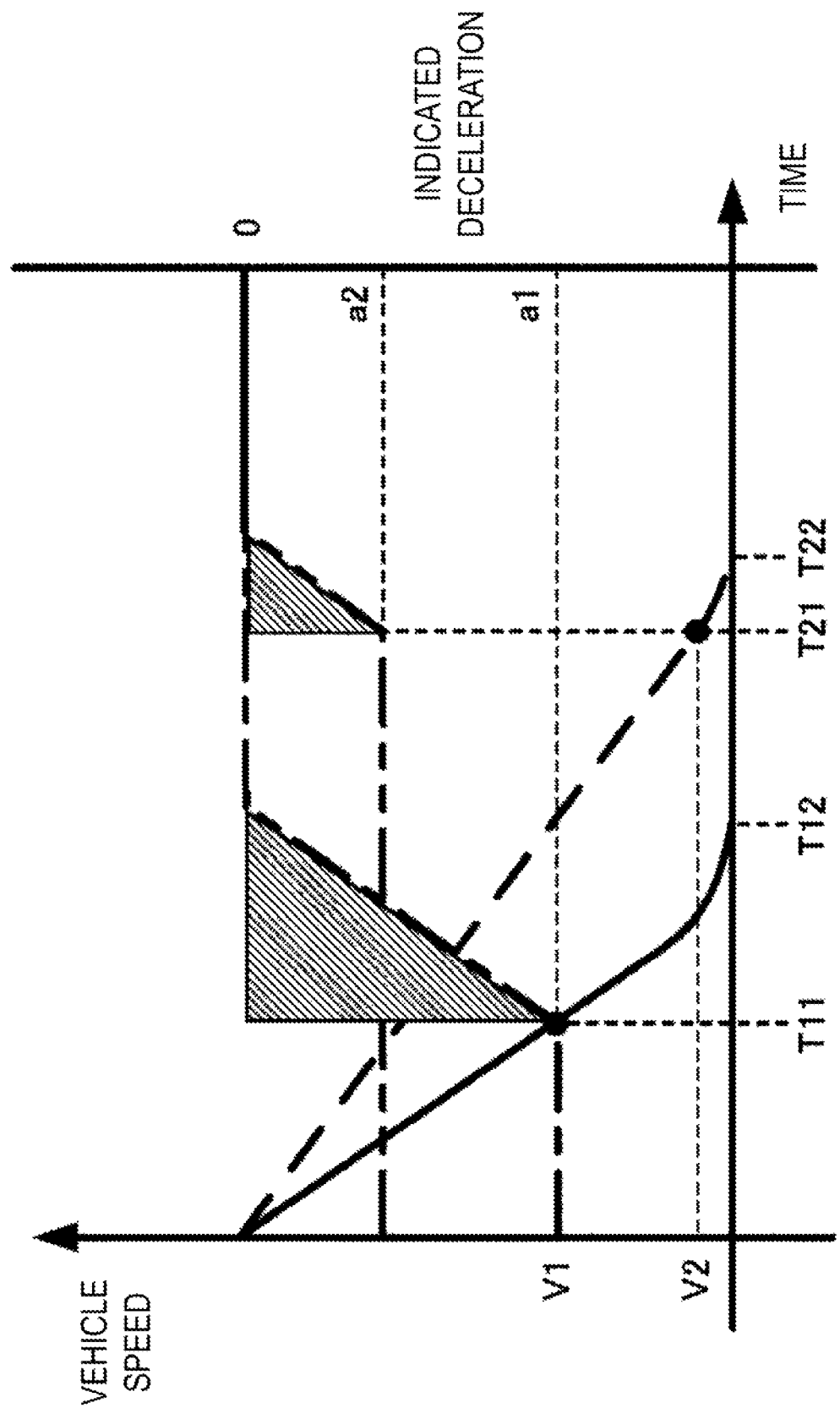
FIG. 6 is a diagram illustrating another threshold value determination method of the threshold value determination unit.

FIG. 6 is a diagram illustrating another threshold value determination method of the threshold value determination unit 124. Assuming that the vehicle T generates a deceleration in accordance with an indicated deceleration, the diagonal line part in FIG. 6 (time integral value of acceleration) is an amount $\Delta V$ of vehicle speed change from the start of the brake pressure reduction to the stop of the vehicle T. Specifically, $\Delta V$ is calculated by $\Delta V = 1/2 \times (T12-T11) \times (-a1)$. Further, an inclination (jerk) a' of the indicated deceleration from T11 to T12 is calculated by $a' = (-a1)/(T12-T11)$. From these equations, $\Delta V = a1^2/2a'$ is satisfied.

Accordingly, the threshold value determination unit 124 may reduce the brake pressure by the inclination a' from the indicated deceleration a1, and set $V1 = a1^2/2a'$ as a brake pressure reduction start threshold value in order to satisfy the condition of $V1 + \Delta V = 0$ so that the vehicle speed reaches 0 when the indicated deceleration becomes 0. In a case where there is a delay in the deceleration that occurs with respect to the indicated deceleration, and the amount of the delay is known, the threshold value determination unit 124 may determine the brake pressure reduction start threshold value, in view of the delay.

Although the present disclosure has been described above using an embodiment, the technical scope of the present disclosure is not limited to the scope described in the above embodiment, and various modifications and changes can be made within the scope of the gist thereof. For example, all or a part of the device can be functionally or physically distributed or integrated in any unit. Also included in the embodiment of the present disclosure are new embodiments resulting from any combination of a plurality of embodiments. The effects of the new embodiment resulting from the combination include the effects of the original embodiment.

This application is based on a Japanese patent application filed on Sep. 24, 2019 (Japanese Patent Application No. 2019-173071), the contents of which are incorporated herein by reference.

INDUSTRIAL APPLICABILITY

The present disclosure is useful in that it is possible to provide a vehicle control device capable of suppressing swing back when a vehicle is stopped.

REFERENCE SIGNS LIST 1 vehicle control device
2 speed sensor
3 peripheral sensor
4 brake
5 gyro sensor
6 weight sensor
11 storage unit
12 control unit
121 deceleration detection unit
122 stop schedule specifying unit
123 brake control unit
124 threshold value determination unit
125 gradient specifying unit
126 weight specifying unit

The invention claimed is:

1. A vehicle control device comprising:
a processor configured to:
detect a deceleration of an own vehicle which follows a preceding vehicle;
specify that the own vehicle is scheduled to stop based on a change in a speed of the preceding vehicle behind which the own vehicle travels;
start reducing a brake pressure when a traveling speed of the own vehicle becomes equal to or less than a threshold value; and
determine the threshold value such that the threshold value increases as the detected deceleration increases after the specifying that the own vehicle is scheduled to stop.

2. The vehicle control device according to claim 1, wherein the processor is further configured to:
specify a gradient of a road where the own vehicle is traveling, and
wherein the processor determines the threshold value based further on the specified gradient.

3. The vehicle control device according to claim 1, wherein the processor is further configured to specify a weight of the own vehicle, and
wherein the processor determines the threshold value based further on the specified weight.

* * * * *